T. F. WITHERBEE.
TUYERES.

No. 176,913. Patented May 2, 1876.

WITNESSES:
E. Wolff
John Goethals

INVENTOR:
T. F. Witherbee
BY
ATTORNEYS.

UNITED STATES PATENT OFFICE.

THOMAS F. WITHERBEE, OF PORT HENRY, NEW YORK.

IMPROVEMENT IN TUYERES.

Specification forming part of Letters Patent No. 176,913, dated May 2, 1876; application filed February 28, 1876.

*To all whom it may concern:*

Be it known that I, THOMAS F. WITHERBEE, of Port Henry, in the county of Essex and State of New York, have invented a new and Improved Tuyere, of which the following is a specification:

My invention consists of a partition in the water-chamber between the inlet and outlet pipes, to compel the water for cooling the tuyere to pass entirely around it.

Figure 1:
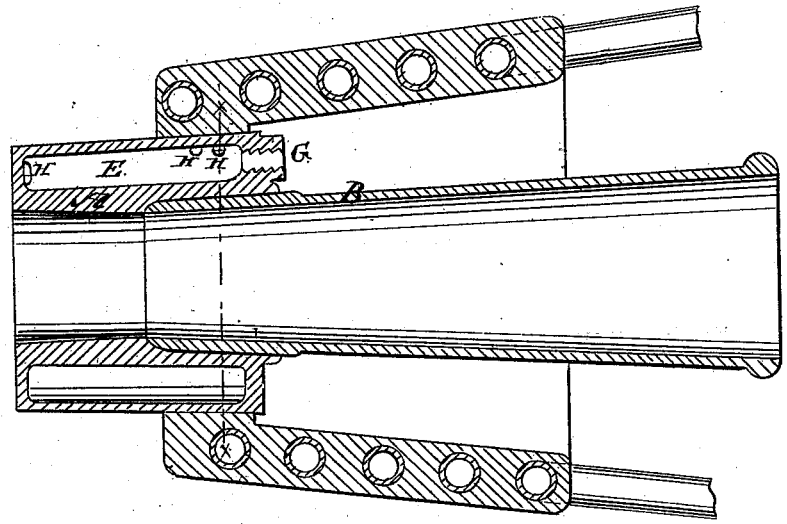
Figure 2:
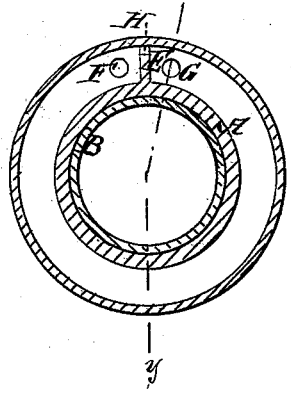
Figure 3:
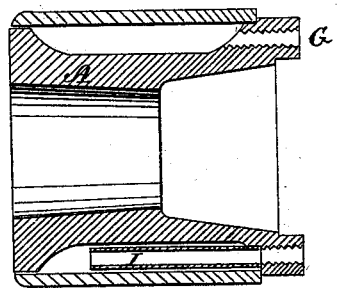

Figure 1 is a longitudinal sectional elevation of a tuyere constructed according to my invention, the section being taken on line $y\,y$, Fig. 2. Fig. 2 is a transverse section taken on line $x\,x$ of Fig. 1. Fig. 3 represents a modification of my invention.

Similar letters of reference indicate corresponding parts.

A is the tuyere, and B the nozzle of the air-pipe. E represents the partition which I propose to arrange between the inlet-pipe F and the outlet G, to compel the water to pass entirely around the tuyere; but to prevent air from collecting on the inlet side I make the air-passages H through the partition, said passages being sufficient to let the air escape without much water.

I propose, as a modification of my invention, to dispense with the partition-plate, and use, instead, a long induction-tube, I, which enters the water-chamber at one end and passes to near the other end, as is shown in Fig. 3. The induction-tube serves as a partition to cause the water to circulate through the water-chamber, and pass out through the eduction opening or tube G.

It will be perceived by reference to the drawing that the tuyere is tapered divergingly, or in an opposite direction from the nozzle. By flaring the tuyere after it leaves the end of nozzle the operation of cleaning is greatly simplified and facilitated, the lodgment of obstructions being, to a great extent, prevented.

What I claim is—

1. The tuyere A, flared in an opposite direction from nozzle B, substantially as and for the purpose specified.

2. The partition E in the water-chamber between the inlet and outlet, substantially as specified.

3. The partition E, having the air-passages H, substantially as specified.

THOMAS F. WITHERBEE.

Witnesses:
CHARLES S. JUDD,
FRANK S. ATWELL.